United States Patent
Grant

(10) Patent No.: US 9,061,242 B2
(45) Date of Patent: *Jun. 23, 2015

(54) APPARATUS FOR TREATING A GAS STREAM

(75) Inventor: Robert Bruce Grant, Steyning (GB)

(73) Assignee: Edwards Limited, Crawley, West Sussex (GB)

( * ) Notice: Subject to any disclaimer, the term of this patent is extended or adjusted under 35 U.S.C. 154(b) by 0 days.

This patent is subject to a terminal disclaimer.

(21) Appl. No.: 12/892,025

(22) Filed: Sep. 28, 2010

(65) Prior Publication Data

US 2011/0014090 A1 Jan. 20, 2011

Related U.S. Application Data

(62) Division of application No. 11/886,977, filed as application No. PCT/GB2006/000806 on Mar. 7, 2006, now Pat. No. 7,824,637.

(30) Foreign Application Priority Data

Mar. 24, 2005 (GB) .................................. 0506060.3

(51) Int. Cl.
*B01D 53/70* (2006.01)
*B01D 53/86* (2006.01)
*B01D 53/22* (2006.01)
*B01J 35/06* (2006.01)

(52) U.S. Cl.
CPC .......... *B01D 53/8659* (2013.01); *B01D 53/228* (2013.01); *B01J 35/065* (2013.01); *Y02C 20/30* (2013.01)

(58) Field of Classification Search
USPC ............. 95/43, 55, 56; 96/4–14; 55/523, 524, 55/525; 423/210, 239.1–242.1, 462–507
See application file for complete search history.

(56) References Cited

U.S. PATENT DOCUMENTS 6,281,403 B1 * 8/2001 White et al. ................. 585/658
7,824,637 B2 11/2010 Grant
(Continued)

FOREIGN PATENT DOCUMENTS

EP 0541246 A1 5/1993
JP H04280989 A 10/1992
(Continued)

OTHER PUBLICATIONS

Liu et al. "Preparation and characterisation of SiCe0.95Yb0.05O2. 075 hollow fibre membranes", 2001, Journal of Membrane Science, 193m p. 249-260.*
Prosecution history of corresponding U.S. Appl. No. 11/886,977 including: Notice of Allowance and Examiner Interview Summary dated Jul. 12, 2010: Amendment dated Mar. 17, 2010 and Office Action dated Dec. 21, 2009.
(Continued)

*Primary Examiner* — Stanley Silverman
*Assistant Examiner* — Syed Iqbal
(74) *Attorney, Agent, or Firm* — Westman, Champlin & Koehler, P.A.

(57) ABSTRACT

Apparatus for treating a gas stream comprises a plurality of cylindrical proton conducting membranes. The gas stream is conveyed through the bore of each cylindrical membrane, and a hydrogen-containing gas is conveyed about the external surface of each cylindrical membrane. A catalyst provided on the inner side of each membrane catalyses a reaction between a halogen-containing component of the gas stream, such as $CF_4$, adsorbed on the surface of the catalyst and protons conducted through the membrane.

13 Claims, 2 Drawing Sheets

(56) References Cited

U.S. PATENT DOCUMENTS

2001/0001652 A1 5/2001 Kanno et al.
2002/0021995 A1 2/2002 Balachandran et al.
2004/0260130 A1 12/2004 Chau et al.

FOREIGN PATENT DOCUMENTS

| JP | 2000325732 A | | 11/2000 |
|---|---|---|---|
| JP | 2001232152 A | * | 8/2001 |
| JP | 2004002980 A | | 1/2004 |

OTHER PUBLICATIONS

British Search Report dated Aug. 5, 2005 for British Application No. 0506060.3.
PCT International Search Report dated Jun. 26, 2006 for PCT Application No. PCT/GB2006/000806.
PCT Written Opinion dated Jun. 26, 2006 for PCT Application No. PCT/GB2006/000806.

* cited by examiner

APPARATUS FOR TREATING A GAS STREAM

CROSS-REFERENCES TO RELATED APPLICATIONS

This is a divisional application of application Ser. No. 11/886,977 filed Sep. 24, 2007.

BACKGROUND OF THE INVENTION

The present invention relates to apparatus for, and a method of, treating a gas stream.

A common requirement in integrated circuit fabrication is plasma etching of openings such as contacts, vias and trenches in dielectric materials formed on semiconductor substrates. With device geometries becoming increasingly smaller, there is a requirement to form deep and narrow openings with high aspect ratios. One suitable technique for forming such openings in silicon oxide is a plasma etching technique, in which a fluorocarbon etchant gas having the general formula $C_xF_yH_z$, where $x \geq 1$, $y \geq 1$ and $z \geq 0$, is supplied to a process chamber of a plasma etch reactor together with one more noble gases, which perform the dual roles of providing an inert carrier gas for the etchant gas and aiding fluorine in attacking the silicon oxide.

The use of xenon as one of the noble gases has been found to provide increased selectivity and reduced resist damage in comparison to a system using argon alone. However, as xenon occurs in atmospheric air in very low concentrations, its cost is very high (the current cost of xenon is around $4/sl) and its availability can be somewhat limited. Given that the estimated usage of xenon in a plasma etch reactor comprising four processing chambers is around 250,000 to 500,000 litres per annum, it is very desirable to recover and re-use expensive noble gases such as xenon and/or krypton which are contained within the effluent stream exhaust from the process tool.

The recovery of such a noble gas, or noble gas mixture, is, however, hampered by other components of the effluent stream. These can include:

Unconsumed reactants;
By-products from the plasma etching;
Purge gas supplied to a pumping system for drawing the effluent stream from the chamber; and
Other noble gases.

Unconsumed fluorocarbon etchant is particularly undesirable, as such gases are known to have relatively high greenhouse activity. It is relatively easy to destruct chlorofluorocarbons (CFCs) and perfluorocarbons (PFCs) with more than one carbon atom in plasma reactors either at reduced pressure upstream from one or more vacuum pumps or at the 'atmospheric' exhaust of the vacuum pumps. However, $CF_4$, due to the exceptionally strong carbon-fluorine bond, is very hard to destroy at high destruction efficiency. This is particularly a problem when exhaust gas components are recirculated back into the process and recirculation extra levels of destruction/purification are demanded to ensure the correct levels of gas purity.

Historically, $CF_4$ is destructed by use of thermal means, for example a thermal processing unit (TPU), but these systems are expensive and not cost effective for low flows of $CF_4$. Alternatively a plasma system can be used but here the destruction efficiency for $CF_4$ is low; for high destruction efficiencies large, high-powered systems are required.

It is an aim of at least the preferred embodiment of the invention to provide apparatus for treating a gas stream that can remove $CF_4$ with relatively high efficiency.

SUMMARY OF THE INVENTION

In a first aspect, the present invention provides apparatus for treating a gas stream, the apparatus comprising a plurality of cylindrical proton conducting membranes connected in parallel, means for supplying the gas stream to the bore of each cylindrical membrane, means for supplying a hydrogen-containing gas to the external surface of each cylindrical membrane, and a catalyst provided on the inner side of each membrane for catalysing a reaction between a halogen-containing component of the gas stream and protons conducted through the membrane.

The invention uses proton conducting membranes to selectively separate hydrogen from a hydrogen-containing gaseous mixture. Hydrogen transport occurs when a difference in the chemical potential of hydrogen exists across a membrane. On the high hydrogen partial pressure side of the membrane, molecular hydrogen dissociates into protons and electrons, which migrate to the low hydrogen partial pressure side of the membrane. The highly reactive protons ($H^+$ ions) react with halogen-containing components of the gas stream supplied to that side of the membrane to form methane and one or more of HF and HCl. The presence of a catalyst on that side of a membrane serves to reduce the activation energy for the reaction. As a result, $CF_4$ contained within the gas stream can be destroyed with high efficiency.

Each membrane is in the form of a cylinder having a bore for receiving the gas stream from the gas stream supply means, the catalyst being located on the inner surface of the cylindrical membrane. In order to increase the efficiency of the destruction, the apparatus comprises a plurality of said cylindrical membranes connected in parallel for receiving the gas stream from the gas stream supply means.

Each membrane is preferably at least partially located in a housing comprising an inlet for receiving the hydrogen-containing gas and an outlet for exhausting gas therefrom. Means may be provided for controlling the temperature of the membranes. Depending on the nature of the proton conducting membranes, the membranes may need to be heated to an elevated temperature, typically around 500 to 600° C., to have the required degree of proton conductivity. A heater may be conveniently provided about the housing of the apparatus to heat the membranes to the required temperature.

The catalyst preferably comprises material for adsorbing the halogen-containing component of the gas stream. Examples of a suitable catalyst include, but are not limited to, one of aluminium phosphate, gamma alumina, a $TiO_2/ZrO_2$ mixed oxide, or other acidic oxide.

Means may be provided for supplying a hydrogen-containing gas to the gas stream upstream from the membranes. This can facilitate the complete reduction of the halogen-containing component of the gas stream.

In a second aspect, the present invention provides a method of treating a gas stream, the method comprising the steps of providing a plurality of cylindrical proton conducting membranes connected in parallel and each having a catalyst provided on the inner side thereof for catalysing a reaction between a halogen-containing component of the gas stream and protons conducted through the membrane, supplying the gas stream to be treated to the bore of each cylindrical membrane, and supplying a hydrogen-containing gas to the external surface of each cylindrical membrane.

Features described above relating to apparatus aspects of the invention are equally applicable to method aspects, and vice versa.

BRIEF DESCRIPTION OF THE DRAWINGS

Preferred features of the present invention will now be described with reference to the accompanying drawings, in which.

DETAILED DESCRIPTION OF THE INVENTION

Figure 1:
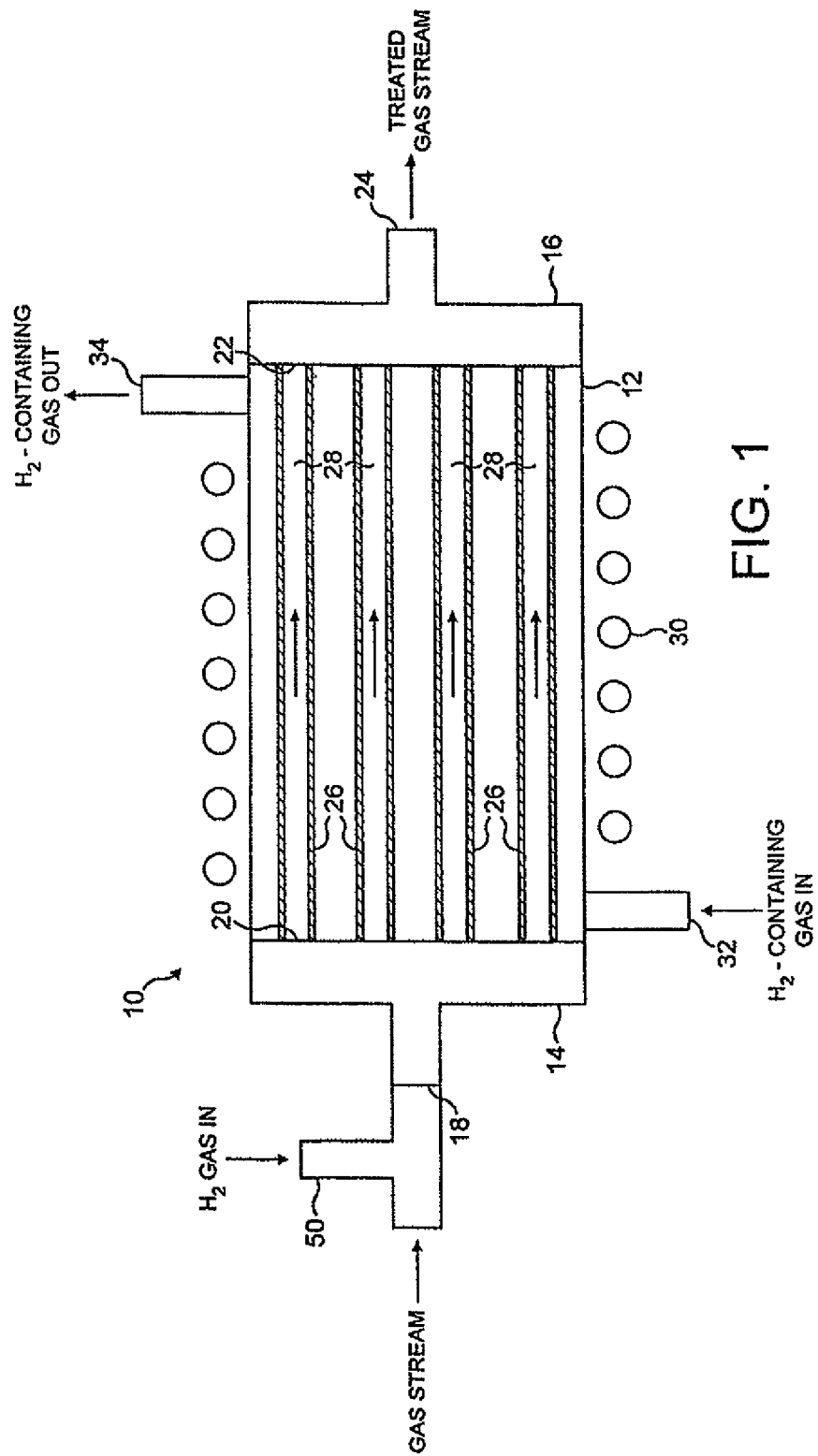
FIG. 1 illustrates a cross-section through an apparatus for treating a gas stream.

With reference first to FIG. 1, apparatus 10 for treating a gas stream comprises a housing 12 having an inlet manifold 14 for receiving the gas stream to be treated and an outlet manifold 16 for exhausting the treated gas stream. The inlet manifold 14 has an inlet 18 and a plurality of outlets 20, and the outlet manifold 16 has a plurality of inlets 22 and an outlet 24. The housing 12 houses a plurality of cylindrical proton conducting membranes 26 each connected at one end thereof to a respective outlet 20 of the inlet manifold 14 and at the other end thereof to a respective inlet 22 of the outlet manifold 16 to convey the gas stream through the bores 28 thereof. The apparatus may be provided with any suitable number of cylindrical membranes 26 connected in parallel between the inlet and outlet manifolds 14, 16.

The cylindrical membranes 26 are preferably formed from a mixed proton and electron conducting material. Due to the nature of the gas stream which may pass through the bores 28 of the membranes 26, the membranes 26 are preferably formed from ceramic material, such as one of $CaZr_{0.9}In_{0.1}O_{3-x}$, $BaZr_{0.9}Y_{0.1}O_{3-x}$, $Ba_3Ca_{1.18}Nb_{1.82}O_{9-x}$ and $SrCe_{0.95}Yb_{0.05}O_{2.975}$. Depending on the nature of the material used to form the cylindrical membranes 26, the membranes may require heating to raise their temperature to a temperature at which the membranes 26 are able to conduct protons and electrons therethrough. In view of this, the apparatus 10 may comprise a heater 30 extending about the housing 12 for heating the membranes 26 to the required temperature, which, depending again on the material used to form the membranes 26, may be around 500 to 600° C.

Figure 2:
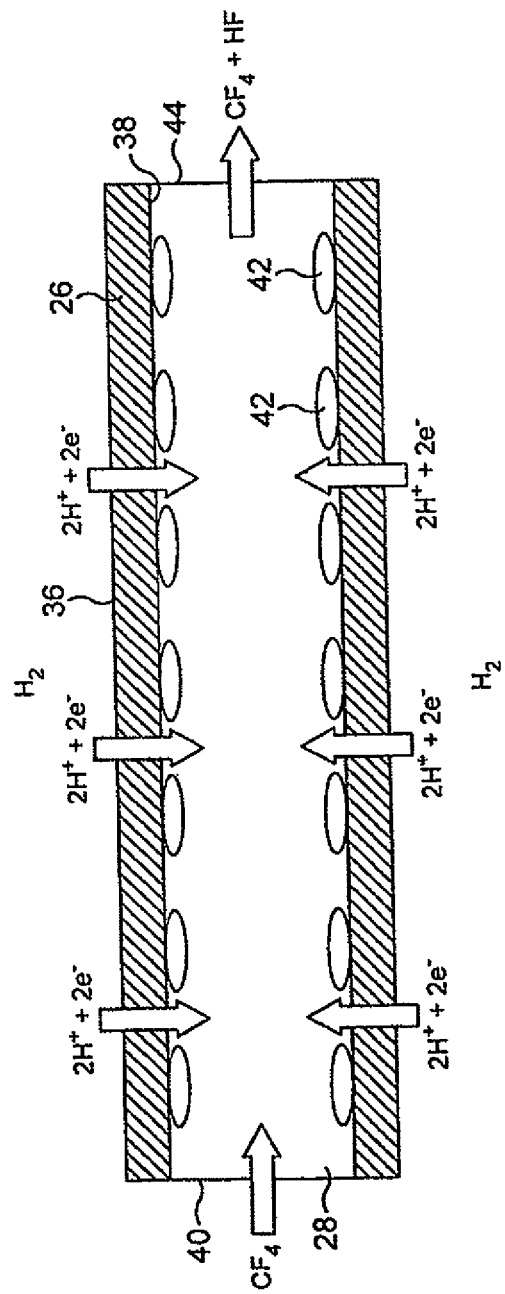
FIG. 2 illustrates a cross-section through a single cylindrical membrane of the apparatus of FIG. 1.

As illustrated in FIG. 1, the housing 12 contains an inlet 32 at one end thereof for receiving a hydrogen-containing gas from a suitable source thereof. The hydrogen-containing gas may be simply hydrogen gas, or a gas comprising hydrogen and at least one other gas, such as nitrogen, so that a non-combustible gas mixture is supplied to the housing 12. Within the housing 12, the gas passes around the external surfaces of the cylindrical membranes 26 before being exhaust from the housing 12 through outlet 34. With reference now to FIG. 2, in use there is a relatively high partial pressure of hydrogen at the external surfaces 36 of the cylindrical membranes 26, and a relatively low hydrogen partial pressure at the internal surfaces 38 of the cylindrical membranes. As a result, the hydrogen molecules contained within the gas passing around the external surfaces 36 of the cylindrical membranes 26 dissociate to form protons ($H^+$ ions) and electrons, which are conducted through the cylindrical membrane 26 towards the internal surface 38.

The gas stream to be treated is received at the inlet 40 of each cylindrical membrane 26 and passes through the bore 28 of the membrane 26. Halogen-containing components of the gas stream may include any fluorine-containing compound, for example a perfluorocompound such as $CF_4$, a hydrofluorocarbon compound, or a chlorofluorocarbon compound. These components of the gas stream are adsorbed on the surface of a catalyst 42 deposited on the internal surface 38 of the membrane 26. Examples of a suitable catalyst include, but are not limited to, one of aluminium phosphate, gamma alumina, a $TiO_2/ZrO_2$ mixed oxide, or other acidic oxide. The protons conducted through the membrane 26 react with the adsorbed compounds to form compounds such as methane and (depending on the nature of the halogen-containing component of the gas stream) one or more of HF and HCl, which are exhaust from the outlet 44 of the membrane 26. As illustrated at 50 in FIG. 1, additional gaseous hydrogen may be added to the gas stream upstream from the housing 12 to facilitate the complete reduction of the halogen-containing component of the gas stream.

The invention claimed is:

1. Apparatus for treating a gas stream, the apparatus comprising:
a plurality of cylindrical proton conducting membranes connected in parallel;
means for supplying the gas stream to a bore of each of the cylindrical membranes;
means for supplying a hydrogen-containing gas to an external surface of the cylindrical membrane constructed for conducting hydrogen protons decomposed from the hydrogen-containing gas from the external surface of the cylindrical membrane to an inner side thereof; and
a catalyst provided on the inner side of each membrane for catalysing a reaction between a halogen-containing component of the gas stream and the hydrogen protons conducted through the cylindrical membrane in a manner that the hydrogen protons are added to the gas stream by replacing the halogen-containing component with the hydrogen protons.

2. The apparatus according to claim 1, wherein the gas stream supply means comprises a manifold having an inlet for receiving the gas stream and a plurality of outlets each connected to one end of the bore of a respective cylindrical membrane.

3. The apparatus according to claim 2, comprising an exhaust manifold having a plurality of inlets each connected to the other end of the bore of a respective cylindrical membrane and an outlet for exhausting the treated gas stream.

4. The apparatus according to claim 1, wherein the membranes are at least partially located in a housing comprising an inlet for receiving the hydrogen-containing gas and an outlet for exhausting gas therefrom.

5. The apparatus according to claim 1, comprising means for controlling the temperature of the membranes.

6. The apparatus according to claim 1, wherein the hydrogen-containing gas is a gas comprising hydrogen and at least one other gas.

7. The apparatus according to claim 1, wherein the hydrogen-containing gas is a gas comprising hydrogen and nitrogen.

8. The apparatus according to claim 1, wherein each membrane is formed from a proton conducting ceramic.

9. The apparatus according to claim 8, wherein the proton conducting ceramic comprises at least one compound selected from the group consisting of $CaZr_{0.9}In_{0.1}O_{3-x}$, $BaZr_{0.9}Y_{0.1}O_{3-x}$, $Ba_3Ca_{1.18}Nb_{1.82}O_{9-x}$ and $SrCe_{0.95}Yb_{0.05}O_{2.975}$.

10. The apparatus according to claim 1, wherein the catalyst comprises material for adsorbing the halogen-containing component of the gas stream.

11. The apparatus according to claim 1, wherein the catalyst comprises an acidic oxide.

12. The apparatus according to claim 1, wherein the catalyst comprises at least one compound selected from the group consisting of aluminium phosphate, gamma alumina, and a $TiO_2/ZrO_2$ mixed oxide.

13. The apparatus according to claim 1, comprising means for supplying a hydrogen-containing gas to the gas stream upstream from the membranes.

* * * * *